April 22, 1969     A. LLOYD ET AL     3,439,411

JOINING OF DISPERSION STRENGTHENED LEAD

Filed July 20, 1966

INVENTORS
ARNOLD LLOYD
Peter Robert Newson
BY
Nolte & Nolte
ATTORNEYS

United States Patent Office 3,439,411
Patented Apr. 22, 1969

3,439,411
JOINING OF DISPERSION STRENGTHENED LEAD
Arnold Lloyd, London, and Exeter Robert Newson, Chester, England, assignors, by mesne assignments, to St. Joseph Lead Company, New York, N.Y., a corporation of New York
Filed July 20, 1966, Ser. No. 566,601
Int. Cl. B23k 31/02
U.S. Cl. 29—499         2 Claims

ABSTRACT OF THE DISCLOSURE

A method of joining dispersion strengthened lead by application of a molten lead antimony alloy containing 3 to 11% by weight of antimony and the balance consisting of lead.

---

Dispersion strengthened lead, i.e. lead fabricated from lead powder and containing a small amount of lead oxide uniformly distributed therein as fine particles, is known to have mechanical properties superior to those of ordinary lead. A method of fabricating dispersion strengthened lead is described in British specification No. 970,259. The field of useful application of dispersion strengthened lead has, however, hitherto been restricted by reason of the difficulty of joining a piece of this material to a piece of the same material or of some other metal. Thus it is impossible to make a satisfactory welded joint with dispersion strengthened lead because fusion of the material destroys in the area concerned the beneficial effects arising from the included lead oxide.

The invention provides a method of joining a piece of dispersion strengthened lead to a piece of the same material, or of another metal, which comprises making a burnt joint between the two pieces by introducing between them a molten lead-antimony alloy containing 3–11% by weight of antimony. Such binary lead antimony alloys have melting point within the range of 252°–300° C., which is sufficiently below the melting point of lead, 327° C., to ensure that the dispersion strengthened lead will not be melted as the result of the joining operation. It is preferred to use a lead antimony alloy containing 4–10% of antimony.

The lead antimony alloy may be supplied from a rod melted by the use of a welding torch, the joining operation resembling soldering but not requiring the use of any fluxes. The lead antimony alloy diffuses for a very small distance only, e.g. 0.001", into the surface of the dispersion strengthened lead and as the latter is not melted its mechanical properties are not impaired.

The lead antimony alloy used to make the joint has approximately the same mechanical properties as dispersion strengthened lead and approximately the same corrosion resistance. Thus sheets and other pieces of dispersion strengthened lead can be joined by the method according to the invention to fabricate apparatus for use in the chemical industry without the risk of significant corrosion at the joints. A firm and secure joint is obtained. This is believed to be due to the fact that antimony has a greater affinity for oxygen than lead, with the result that there is some reaction between the antimony in the bonding alloy and particles of lead oxide near the surface of the dispersion strengthened lead which ensures a true metal to metal bond at the interface between the dispersion strengthened lead and the bonding alloy. In this connection it is significant that an alloy of lead and bismuth, which has a lesser affinity to oxygen than lead, although having a lower melting point than lead cannot be successfully used for joining pieces of dispersion strengthened lead, the dispersion strengthened lead tending to pull away from the bonding alloy under tension.

The following are the results of tests to determine the breaking loads of certain standard test pieces. In each case the lead oxide content of the material was calculated as PbO.

Material:                                           Breaking load in pounds
(1) ¼" sheet of dispersion strengthened lead containing 1.5% PbO without joint _____ 315
(2) Butt joint with lead containing 4% antimony between two ¼" sheets of dispersion strengthened lead containing 1.2% PbO _____ 265
(3) Lap joint with lead containing 4% antimony between two sheets as in test 2 _____ 290
(4) Butt joint with lead containing 6% antimony between two ¼" sheets of dispersion strengthened lead containing 1.5% PbO _____ 298
(5) Butt joint with lead containing 8% antimony between two ¼" sheets of dispersion strengthened lead containing 2.5% PbO _____ 293
(6) Lap joint with lead containing 6% antimony between two ¼" sheets of dispersion strengthened lead containing 4% PbO _____ 271

The accompanying diagrammatic drawings indicate various forms of joint which can be made by the method according to the invention. In the drawings:

FIGURE 1 shows a butt joint between two sheets 10, 11 of dispersion strengthened lead. As shown the abutting edges of the sheet have been chamfered to form a V-groove into which the molten lead antimony alloy 12 has been introduced.

FIG. 2 shows a corner joint between two sheets 10, 11 of dispersion strengthened lead. In this case the sheet 10 only has been chamfered.

Figures 1, 2:
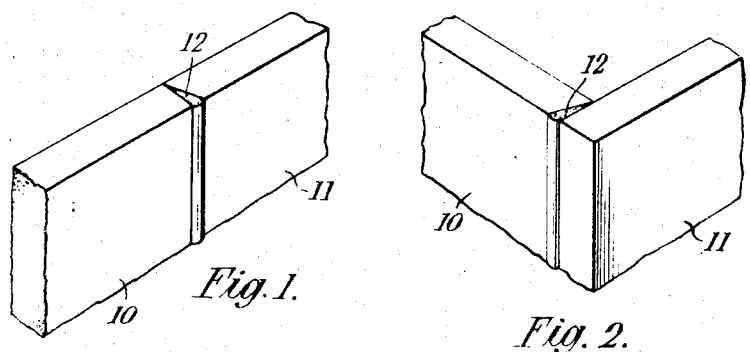
FIG. 1 shows a butt joint between two sheets.
FIG. 2 shows a corner joint between two sheets.
Figure 3:
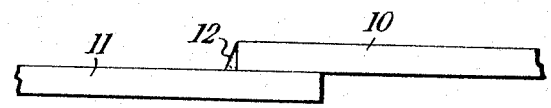
FIG. 3 shows a lap joint between two sheets.

The overlap joint shown in FIG. 3 between the two sheets 10, 11 has been made by applying the molten lead antimony alloy to the end of the sheet 10. Sufficient amounts of the molten alloy will flow between the overlapping parts of the sheets to form the joint and a mound 12 of solidified alloy remains after the joint has been completed, abutting against the end of the sheet 10 to provide reinforcement for the joint.

Figures 4, 5:
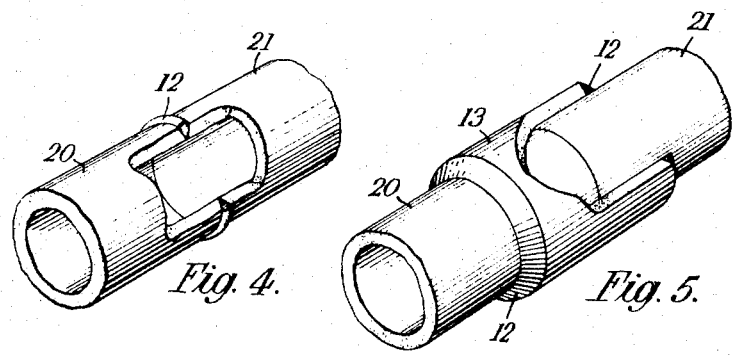
FIG. 4 shows a butt joint in a pipe.
FIG. 5 shows a sleeve joint in a pipe.

FIG. 4 shows a butt joint 12 between two pipes 20, 21 of dispersion strengthened lead. FIG. 5 shows how two pipes 20, 21 of dispersion strengthened lead may be joined by two joints 12 to a sleeve 13 which may or may not be of dispersion strengthened lead.

Figures 6, 7:
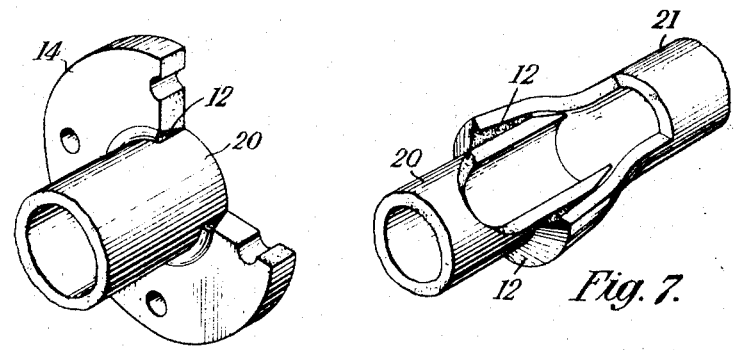
FIG. 6 shows a flanged pipe joint.
FIG. 7 shows a cup joint in a pipe.

FIG. 6 indicates how pipes of dispersion strengthened lead may be joined end to end by attaching to the end of each pipe 20 a flange 14 of lead containing 6% antimony having a V-shaped configuration adjoining the pipe and joined to the pipe by a bonding layer 12 of lead antimony alloy. The pipes are joined by bolting the flanges together.

FIG. 7 shows a cup joint between two pipes 20, 21.

The invention is also of useful application in the joining of terminals above the level of the electrolyte to battery plates made of dispersion strengthened lead.

It will be understood that the antimony content of the lead alloy used to make the joint will be selected, having regard to the oxide content of the dispersion strengthened lead, to ensure that the joint has substantially the same mechanical properties as the sheets or pipes which are joined together. There will be no substantial reduction of the creep resistance of the composite article having regard to the fact that the joint is so small. While the strength of antimonial lead falls off at increased temperature and while the strength of dispersion strengthened lead does not, it is believed that the detrimental effect in this direction of the alloy used for making the joint will be of little significance, again because the joint is so small.

What we claim as our invention and desire to secure by Letters Patent is:

1. A method of joining a piece of dispersion strengthened lead to a piece of the same material, or another metal, which comprises making a burnt joint between the two pieces by introducing between them a molten lead antimony alloy containing 3 to 11% by weight of antimony and the balance consisting of lead.

2. A method as claimed in claim 1, wherein the alloy contains 4–10% by weight of antimony.

References Cited

UNITED STATES PATENTS

| | | | |
|---|---|---|---|
| 2,122,185 | 6/1938 | Smith | 29—504 X |
| 2,123,455 | 7/1938 | Thomas | 29—504 X |
| 2,293,602 | 8/1942 | Ferguson | 75—166 |
| 2,303,194 | 11/1942 | Bouton | 75—166 |
| 2,351,477 | 6/1944 | Bouton | 75—166 |
| 2,506,348 | 5/1950 | Lynn | 75—166 |
| 3,197,682 | 8/1965 | Harvey | 75—166 X |
| 3,253,912 | 5/1966 | Rooney | 75—166 |
| 3,310,438 | 3/1967 | Huffman | 75—166 X |

JOHN F. CAMPBELL, *Primary Examiner.*

R. F. DROPKIN, *Assistant Examiner.*

U.S. Cl. X.R.

29—194, 503, 504

PO-1050
(5/69)

UNITED STATES PATENT OFFICE
CERTIFICATE OF CORRECTION

Patent No. 3,439,411                     Dated April 22, 1969

Inventor(s) Arnold Lloyd et al.

It is certified that error appears in the above-identified patent and that said Letters Patent are hereby corrected as shown below:

Column 4, line 9, the patent number "3,197,682" should read -- 3,197,862 --.

SIGNED AND
SEALED

OCT 7 - 1969

(SEAL)
Attest:

Edward M. Fletcher, Jr.
Attesting Officer

WILLIAM E. SCHUYLER, JR.
Commissioner of Patents